United States Patent [19]

Kaettlitz et al.

[11] Patent Number: 5,169,542
[45] Date of Patent: Dec. 8, 1992

[54] FILTERS FOR LIGHT METALS

[75] Inventors: Wolfgang P. Kaettlitz; Reinhard Stoetzel, both of Borken, Fed. Rep. of Germany

[73] Assignee: Foseco International Limited, Birmingham, England

[21] Appl. No.: 859,855

[22] Filed: Mar. 30, 1992

[30] Foreign Application Priority Data

Apr. 5, 1991 [GB] United Kingdom ................ 9107223

[51] Int. Cl.$^5$ ............................................. B01D 39/20
[52] U.S. Cl. ..................................... 210/767; 75/409; 75/412; 210/496; 210/510.1
[58] Field of Search ..................... 210/767, 496, 510.1; 75/407, 412, 409

[56] References Cited

U.S. PATENT DOCUMENTS 3,962,081 6/1976 Yarwood et al. ................ 210/510.1

Primary Examiner—Frank Sever
Attorney, Agent, or Firm—Nixon & Vanderhye

[57] ABSTRACT

Filters for filtering molten light metals comprise a reticular foam having a composition comprising graphite, wollastonite, silica and an alkali phosphate glass. The filters have a low hardness and can readily be machined accurately from large pieces of the filter material. In a preferred embodiment the exterior surfaces of the large pieces of filter are coated with a composition comprising graphite and a binder prior to firing and then machined.

19 Claims, No Drawings

FILTERS FOR LIGHT METALS

This invention relates to filters for filtering light metals, by which term is to be understood aluminium, magnesium, alloys of these two metals, and alloys of either or both of these metals with other metals in which alloys, aluminium and/or magnesium predominate. In particular the invention relates to filters of relatively small size for use in dies for the gravity diecasting of aluminium or aluminium alloys.

It is well known to use open-cell ceramic foams to filter molten light metals. Such ceramic foam filters are generally made by impregnating an organic foam, usually polyurethane foam, with an aqueous slurry containing the material which is to form the filter and a binder, removing excess slurry, drying to remove water, and firing the dried impregnated foam to burn off the organic foam to form a ceramic foam.

Using the above method of manufacture individual filters are produced of the required shape and size, or alternatively a large piece of ceramic foam is produced and cut or machined to form individual filters. Both methods of manufacture suffer from disadvantages.

When individual filters of a given nominal size are produced directly from organic foam of a similar size to the filters their dimensional variation is such that problems arise in use, particularly in the gravity die casting of aluminium and its alloys, in which the filter is inserted in a recess in the die. As oversize filters cannot be used because they cannot be inserted in the recess it is common practice to compensate for the dimensional variations by deliberately making the filter slightly too small for the size of the recess. As a result small gaps remain between the edge of the filter and the wall of the recess, and because metal can penetrate through the gaps and bypass the filter, filtration efficiency is reduced. If the filter is loose, crushing of the filter can occur when the die is closed and this can lead to particles of ceramic material from the filter passing through the filter, and into the casting cavity of the die, thus resulting in inclusions in the casting.

When individual filters are produced from large pieces of ceramic foam by cutting or machining, manufacturing costs are high and productivity rates low, due to the nature of the materials from which the filters have hitherto been made. As the materials are brittle fracture of the foam tends to occur when the foam is cut or machined.

It has now been found that the above problems can be overcome by producing individual foam filters from a large piece of foam if the foam has a particular composition.

According to the invention there is provided a filter for the filtration of molten light metals comprising a reticular foam having a composition comprising graphite, wollastonite, silica and an alkali phosphate glass.

The reticular foam filters preferably contain 20-80% by weight graphite, 1-10% by weight wollastonite, 1-20% by weight silica and 1-10% by weight of an alkali phosphate glass having a melting point of 350°-500° C. The silica used to produce the filters should be a very fine particle size silica, for example fumed silica or colloidal silica.

The filters of the invention are made by impregnating a piece of reticulated organic foam, such as polyurethane foam, with an aqueous slurry containing the graphite, wollastonite, silica, alkali phosphate glass and a binder, removing excess slurry (for example by squeezing the impregnated organic foam), drying and firing the impregnated organic foam, and then cutting or machining the resulting piece of inorganic foam to smaller pieces of the required shape and size.

The alkali phosphate glass preferably has a melting point of less than 750° C., and more preferably has a melting point in the range of 350° C. to 500° C.

The alkali phosphate glass may be for example disodium pyrophosphate (melting point 650° C.) or a sodium polyphosphate such as Graham,s salt $(NaPO_3)_x$ which is sometimes termed sodium hexametaphosphate and has a melting point of 628° C. A form of Graham's salt which is commercially available under the name Calgon has a $Na_2O:P_2O_5$ ratio of 1:1 and a degree of polymerisation of 15-20. Other forms having a degree of polymerisation of 6-8 and 12-14 are also commercially available. Alkali phosphate glasses containing both sodium oxide and potassium oxide and a minor proportion of boron oxide may also be used and a glass containing 55-65% by weight $P_2O_5$ 19-23% by weight $Na_2O$, 6.0-8.5% by weight $K_2O$ and 2.0-3.5% by weight $B_2O_3$ whose melting point is of the order of 400° C. is particularly preferred.

Suitable binders for producing the filters include monoaluminium orthophosphate, sodium silicate, silica sol, silicophosphates, and a cement such as high alumina cement. Monoaluminium orthophosphate is preferred and will usually be used in an amount of 5%-30% by weight.

The slurry used to produce the filters may also contain additives to improve the applicational properties of the slurry during impregnation of the organic foam. Examples of such additives are rheological agents, for example organic thickening agents or titania, wetting agents and antifoaming agents.

When used the amount of rheological agent, wetting agent or antifoaming agent will usually be of the order of 0.1-2.0% by weight.

When the impregnated organic foam is fired it is desirable that the firing temperature does not exceed 800° C., unless special precautions are taken, otherwise excessive oxidation of the graphite will occur. The firing temperature will usually be in the range of 600° C.-800° C.

The presence of the wollastonite results in a filter which is tougher and stronger than a similar graphite—based filter which does not contain wollastonite. Furthermore when the filter is bonded by means of a phosphate binder the wollastonite overcomes the tendency of a graphite—based phosphate-bonded filter to pick-up moisture from the atmosphere.

In order to alleviate any tendency for the edges to be friable and to improve strength to facilitate handling, in a preferred embodiment of the invention the exterior surfaces of large filters are coated with a composition comprising graphite and a binder. After the filters have been dried they are coated with an aqueous composition containing graphite and a binder such as monoaluminium orthophosphate, for example by spraying the composition on to the dried filter, the filter is then heated to dry the coating, and finally fired. The fired large filter is then machined to produce small filters of a desired size.

The filters of the invention have a low density compared to ceramic foam filters. Their true density is in the range of 2.0 to 2.3 g/cm$^3$ and their apparent density is in the range of 1.5 to 1.85 g/cm$^3$.

The filters also have a very low hardness, of the order of 0 to 1 on the Mohs scale, and because of the low hardness pieces of the filter material can be machined or cut without damaging machining or cutting tools, and accurately sized filters can be readily be produced.

As the filter dimensions can be accurately controlled the filters can be located in recesses in dies, without the filters being crushed when the dies are closed, and molten metal does not bypass the filters in use because the filters fit accurately in the recesses. Filtration of the metal is therefore efficient.

The filters can be located adjacent a casting in a mould ingate because when the ingate is cut off from the casting, any contact between the cutting device and the filters will not cause excessive wear of the device.

In the manufacture of wheel castings a filter can be located in a sprue bush, and the sprue can be drilled out of the casting as is conventional practice in wheel casting production. When ceramic foam filters are used it is necessary to cut off the first part of the sprue containing the filter, and then drill out the remainder of the sprue.

A foundry can recycle ingates, sprues etc containing the filters without contaminating the metal on remelting because the filters and any pieces or particles of filter material, will float up to the surface of the molten metal and can readily be removed. The filters are therefore particularly useful in high volume automotive casting production in which hitherto the use of filters has not been widespread because cast metal which contains a filter could not be recycled.

The following examples will serve to illustrate the invention:

EXAMPLE 1

Reticular foam filters were produced using an aqueous slurry of the following composition by weight:

| | |
|---|---|
| graphite | 26.1% |
| wollastonite | 3.3% |
| fumed silica | 7.8% |
| proprietary alkali phosphate glass (50% w/w solution) | 8.2% |
| titania | 0.2% |
| monoaluminium orthophosphate (50 w/w solution) | 52.2% |
| wetting agent | 1.1% |
| antifoaming agent | 1.1% |

The alkali phosphate contained both sodium oxide and potassium oxide and also boron oxide, and had a melting point of 400° C.

Large pieces of reticulated polyurethane foam were impregnated with the slurry, excess slurry was removed by squeezing the foam, the foam was then dried at 80° C. for 1 hour and at 150° C. for 30 minutes and finally fired at 700° C. for 1 hour.

Individual filters were then cut from the resulting large pieces of filter material, and the filters were used to filter molten aluminium.

Approximately 1000 used filters and return aluminium were charged into a sloping hearth continuous melting furnace, and the aluminium was remelted and heated to 750° C. No fluxing was used during the remelting operation. The filters floated to the surface of the molten aluminium and were removed in the dross formed on the surface. There was no evidence of contamination of the melt which was then used to produce further castings. All the castings produced were of good quality and they contained no inclusions formed by particulate filter material.

EXAMPLE 2

Approximately 1000 used filters of the same composition as the filters of Example 1, and made by the method described in Example 1, were charged to a 5 tonne fossil fuel melting furnace with return aluminium, and the aluminium was remelted. Conventional melting and drossing fluxes were used, and the filters floated to the surface of the molten aluminium and were skimmed off with the dross. None of the castings produced from the remelted aluminium were rejected due to inclusions caused by filter material.

EXAMPLE 3

A recess was machined in the sprue bush of a low pressure diecasting machine producing wheel castings to allow insertion of a 40 mm diameter filter of the same composition as the filters of Example 1 and made by the method described in Example 1. Wheels of an approximate weight of 7.5 kg were produced using one filter per wheel in an aluminium-silicon eutectic alloy cast at 720° C. The sprues, including the filters, were drilled out of the wheels and collected for remelt. Quality cast wheels were produced and no increased wear on the drill was reported. The sprues were then remelted and filter particles contained in the sprues were removed together with the dross from the surface of the melt.

EXAMPLE 4

Two manifold castings of total weight approximately 6 kg were produced in an aluminium—7% silicon sodium modified alloy by casting the alloy through a 50 mm×100 mm filter located in a runner into a sand mould. The filter had the same composition as the filters of Example 1 and was made by the same method. High quality castings were obtained. The used filter was charged to a remelt furnace together with return metal and other filters which had been used in the same way. On remelting of the returned metal the filters rose to the surface and could be skimmed off with the dross.

EXAMPLE 5

Large pieces of reticular foam filter were produced using the aqueous slurry composition and procedure of Example 1. After drying the pieces were spun on a rotating disc and sprayed with a coating composition containing by weight:

| | |
|---|---|
| graphite | 22.5% |
| fumed silica | 9.5% |
| wetting agent | 0.5% |
| monoaluminium orthophosphate (50 w/w solution) | 54.1% |
| water | 13.4% |

The coated pieces were dried at 120° C. for 30 minutes and the coating procedure was then repeated with the pieces inverted so as to coat what had been the underside in the first coating operation. After drying again at 120° C. for 30 minutes the pieces were fired at 700° C. for hour, and then cut to produce individual filters.

We claim:

1. A filter for the filtration of molten light metals comprising a reticular foam having a composition comprising graphite, wollastonite, silica and an alkali phosphate glass in proportions sufficient to enable a piece of foam of a size from which said filter can be cut or machined.

2. A filter according to claim 1 wherein the reticular foam contains 20-80% by weight graphite, 1-10% by weight wollastonite, 1-20% by weight silica and 1-10% by weight alkali phosphate glass.

3. A filter according to claim 1 wherein the alkali phosphate glass has a melting point of less then 750° C.

4. A filter according to claim 3 wherein the alkali phosphate glass has a melting point of 350° C. to 500° C.

5. A filter according to claim 1 wherein the alkali phosphate glass is disodium pyrophosphate or a sodium polyphosphate.

6. A filter according to claim 1 wherein the alkali phosphate glass contains both sodium oxide and potassium oxide and also a minor proportion of boron oxide.

7. A filter according to claim 6 wherein the alkali phosphate glass contains 55-65% by weight $P_2O_5$, 19-23% by weight $Na_2O$, 6.0-8.5% by weight $K_2O$ and 2.0-3.5% by weight $B_2O_3$.

8. A filter according to claim 1 wherein the silica used to produce the reticular foam is fumed silica or colloidal silica.

9. A filter according to claim 1 wherein the reticular foam contains a binder selected from the group consisting essentially of monoaluminium orthophosphate, sodium silicate, silica sol, silicophosphates and cement.

10. A filter as recited in claim 1 further comprising a composition comprising graphite and a binder disposed as a coating on the exterior surface of said filter.

11. A method of filtering molten light metal comprising the steps of:
   (a) constructing by a process comprising cutting or machining, a reticular foam having a composition comprising graphite, wollastonite, silica and an alkali phosphate glass, so that it has a plurality of pores and passageways therethrough; and
   (b) causing a molten light metal to pass through the filter to remove filterable particles therefrom.

12. A method as recited in claim 11 wherein step (a) is practiced to produce a reticular foam which contains 20-80% by weight graphite, 1-10% by weight wollastonite, 1-20% by weight silica and 1-10% by weight alkali phosphate glass.

13. A method as recited in claim 11 wherein step (a) is practiced by providing an alkali phosphate glass having a melting point of less than 750° C.

14. A method as recited in claim 11 wherein step (a) is practiced to provide, as an alkali phosphate glass, disodium pyrophosphate or a sodium polyphosphate.

15. A method as recited in claim 11 wherein step (a) is practiced to provide, as an alkali phosphate glass a glass containing both sodium oxide and potassium oxide, and also a minor proportion of boron oxide.

16. A method as recited in claim 11 wherein step (a) is practiced to provide an alkali phosphate glass containing 55-65% by weight $P_2O_5$, 19-23% by weight $Na_2O$, 6.0-8.5% by weight $K_2O$ and 2.0-3.5% by weight $B_2O_3$.

17. A method as recited in claim 11 wherein step (a) is practiced utilizing fumed silica or colloidal silica.

18. A method as recited in claim 11 wherein step (a) is practiced also utilizing a binder selected from the group consisting essentially of monoaluminium orthophosphate, sodium silicate, silica sol, silicophosphates, and cement.

19. A method as recited in claim 11 comprising the further step (c), between steps (a) and (b), of coating the exterior surface of the filter with a composition comprising graphite and a binder.

* * * * *